May 25, 1926.
F. W. McCARTHY
CAR PEDESTAL AND SILL BRACKET
Filed Sept. 19, 1925
1,586,255
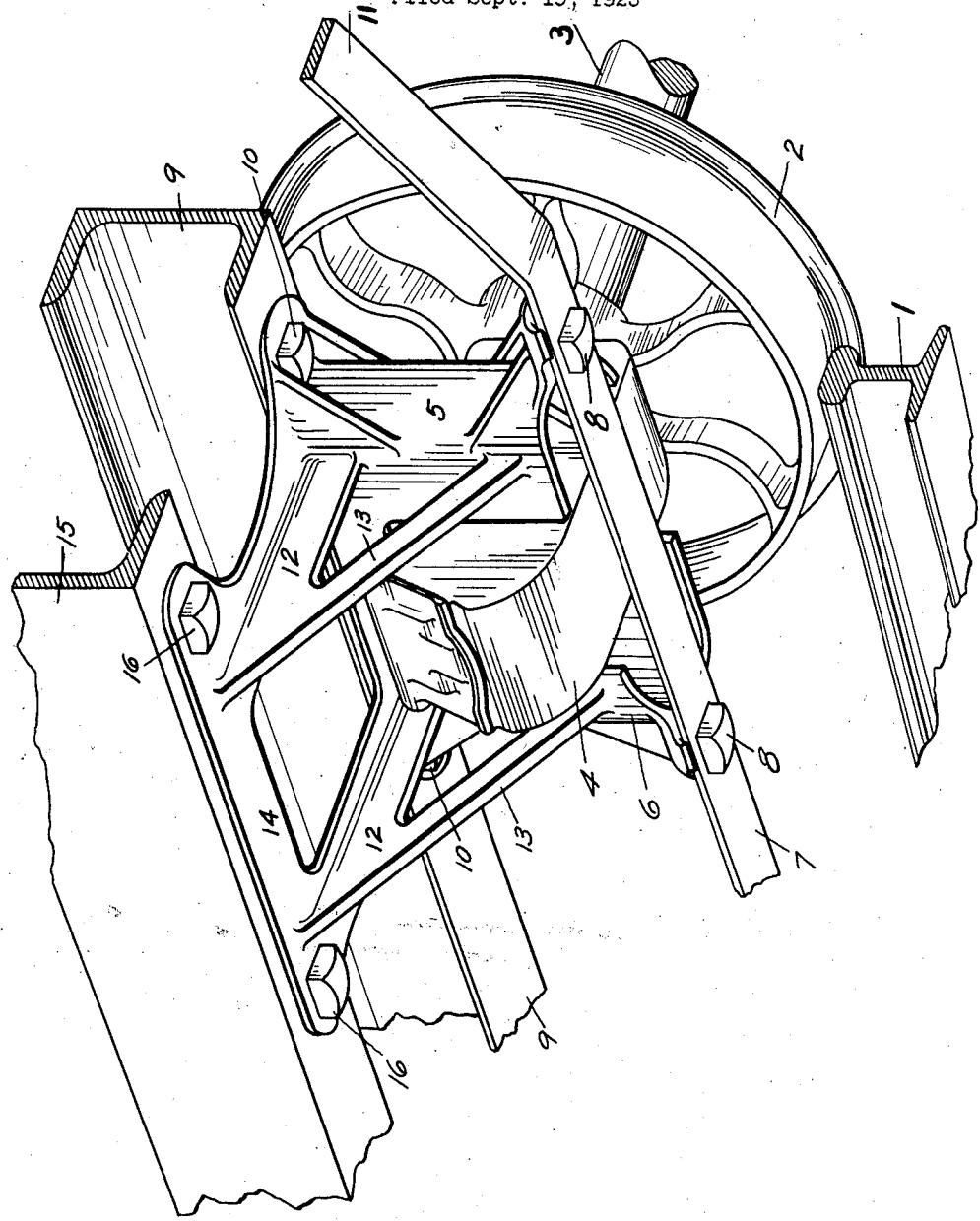
INVENTOR
F. W. McCarthy
BY
Mason Fenwick & Lawrence
ATTORNEY

UNITED STATES PATENT OFFICE.

FRANK W. McCARTHY, OF MAAO, PHILIPPINE ISLANDS, ASSIGNOR TO C. M. LOVSTED, OF SEATTLE, WASHINGTON, DOING BUSINESS AS C. M. LOVSTED & CO.

CAR PEDESTAL AND SILL BRACKET.

Application filed September 19, 1925. Serial No. 57,458.

This invention relates to car pedestals and brackets, and particularly to pedestals beneath the car frames for holding the journal boxes in proper position; and to brackets attached to the pedestals for supporting the outer sills of the car body.

The objects of the invention are, to provide parallel pedestals suitably spaced apart for holding the journal boxes for the axle of cars in position in the usual manner; and also to provide as a part of the pedestals, suitable brackets, extending out at right angles from the upper portions of the pedestals, for supporting the outer sides or frames of the car body.

A further object is to provide car journal box pedestals, with brackets attached to the same and also attached to the outer sides or edges of the car, for the purpose of holding the pedestals rigidly with the frame of the car, and particularly when the wheels of the car and axles therefor are being operated on a curved track.

In the usual construction of small cars for hauling freight, such as sugar cane and other bulky material, the bodies of the cars are made much wider than the space between the track rails, and the latter are for such purposes generally laid about three feet apart, in narrow gauge form. In such construction the journal boxes holding the ends of the axles are located close to the outer sides of the wheels, and the principal supporting sills of the car floor are located in line above the journal boxes, with suitable pedestals extending down from the sills or car frames on each side of the journal boxes, for holding the same in suitable position for the ends of the axles to rotate therein. But as the width of the cars is much greater than the space between such floor sills above the pedestals, the outer edges of the cars, or overhanging portions, tend to sag when loaded, thus and thereby soon destroying the shapes and strength of the cars, and usefulness thereof.

Again, when the loaded cars are hauled along on a curved track, the axles tend to twist the journal boxes and their respective holding pedestals from their proper positions; and it is designed by this invention, to support the outer sides of the cars by brackets which are extensions of or from the pedestals, and which brackets also serve as braces, from the outer frames or sills of the car, for holding the pedestals at all times in their proper positions.

I have illustrated my invention by the accompanying drawing, which shows a perspective view of a side elevation of the pedestals and brackets in position attached to the sills of a car body.

The particular parts are further identified by numerals. 1 is any ordinary track rail, on which the ordinary car wheel 2 rolls, while affixed to the ordinary axle 3. This axle is broken away beyond the wheel, as it is not deemed necessary to show the remainder thereof, or the other wheel thereon, or other rail, or duplicate pedestals etc, as all such are similar on both sides of the cars.

The usual journal box 4, is suitably adjusted and held between the pedestals 5 and 6, the lower ends of both the latter are supported by the usual truss 7 attached by bolts 8, and the tops of the pedestals are attached to the main sill 9 or frame of the car body by other bolts 10. The ends of the truss are bent up as at 11 and attached to the sill 9 at points beyond the boundary of the drawing, in any suitable manner.

My supporting and reinforcing brackets are shown as 12, 12, extending out from the pedestals at right angles thereto, with braces 13, 13, from the lower parts of the pedestals to the outer parts of the brackets, with a connecting plate 14 at the outer ends of the same for supporting the outer or auxiliary frame or sill 15 of the car, by bolts 16, or other suitable means. The brackets thus support the outer sills, and at the same time serve as braces for holding the pedestals in proper place.

While I have described the respective parts of the pedestals and brackets separately, yet in construction, all of such parts are preferably cast from suitable metal in one integral body, and thereby add both to strength and cheapness.

And while I have described my invention by references to certain forms of construction, I do not limit my rights thereby, but desire that any changes may be made in the construction and adaptation, without waiving my exclusive rights to all such other forms, for the purposes described.

Having described my invention, what I claim as new is:

1. A car with a plurality of supporting sills on each side thereof, pedestals attached to an inner sill on the car bottom and extending down beneath the same for holding journal boxes for the car axles, with brackets extending horizontally at right angles to the pedestals and attached thereto, with the outer end of the brackets attached to the outer sill of car bottom for supporting the same.

2. In combination, car pedestals and supporting brackets attached thereto at one end and the other end of the brackets attached to an outer edge of the car frame.

In testimony whereof I affix my signature.

FRANK W. McCARTHY.